United States Patent
Hineno et al.

(10) Patent No.: US 7,485,060 B2
(45) Date of Patent: Feb. 3, 2009

(54) RUBBER COMPOSITION AND POWER TRANSMISSION BELT INCORPORATING THE RUBBER COMPOSITION

(75) Inventors: Yorifumi Hineno, Hyogo (JP); Takeshi Nishiyama, Hyogo (JP); Toshimichi Takada, Hyogo (JP); Hiroki Takechi, Hyogo (JP); Kazuhiro Takeda, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 701 days.

(21) Appl. No.: 10/854,418

(22) Filed: May 26, 2004

(65) Prior Publication Data

US 2005/0037882 A1 Feb. 17, 2005

(30) Foreign Application Priority Data

May 30, 2003 (JP) ............................. 2003-154023
Apr. 9, 2004 (JP) ............................. 2004-116138

(51) Int. Cl.
*F16G 1/00* (2006.01)
*F16G 5/00* (2006.01)
*B32B 25/02* (2006.01)
*B32B 27/12* (2006.01)

(52) U.S. Cl. .................... 474/263; 474/260; 428/295.1; 428/375; 428/395

(58) Field of Classification Search ......... 474/260–268, 474/270–271; 156/137–141, 315; 264/254, 264/296; 428/291.1, 369, 375, 395, 515; 525/432; 524/221
See application file for complete search history.

(56) References Cited

U.S. PATENT DOCUMENTS

| | | | | |
|---|---|---|---|---|
| 5,860,883 A * | 1/1999 | Jonen et al. | .................. | 474/205 |
| 5,954,606 A * | 9/1999 | Mishima et al. | ............. | 474/267 |
| 5,961,412 A * | 10/1999 | Takahashi | .................... | 474/270 |
| 6,177,202 B1 * | 1/2001 | Takehara et al. | ............ | 428/515 |
| 6,358,170 B1 * | 3/2002 | Fujiwara | ..................... | 474/264 |
| 6,461,264 B1 * | 10/2002 | Lofgren | ..................... | 474/260 |
| 6,464,607 B1 * | 10/2002 | Rosenboom et al. | ........ | 474/263 |
| 6,491,598 B1 * | 12/2002 | Rosenboom | ................ | 474/260 |
| 6,607,828 B1 * | 8/2003 | Hasaka | ........................ | 428/369 |
| 6,620,068 B2 * | 9/2003 | Ito et al. | ...................... | 474/205 |
| 6,689,005 B2 * | 2/2004 | Hasaka et al. | ................ | 474/267 |
| 2002/0032091 A1 * | 3/2002 | Okuno et al. | ................ | 474/260 |
| 2003/0180516 A1 * | 9/2003 | Hasaka et al. | ............. | 428/295.1 |
| 2004/0204275 A1 * | 10/2004 | Burrowes et al. | ........... | 474/263 |

FOREIGN PATENT DOCUMENTS

| | | | |
|---|---|---|---|
| EP | 1300442 A1 * | 4/2003 | |
| JP | 59-196341 A * | 11/1984 | |
| JP | 05-1325486 | 5/1993 | |
| JP | 11-193849 A * | 7/1999 | |
| JP | 11-279874 A * | 10/1999 | |
| JP | 2001-173728 | 6/2001 | |

* cited by examiner

*Primary Examiner*—Marcus Charles
(74) *Attorney, Agent, or Firm*—Wood, Phillips, Katz, Clark & Mortimer

(57) ABSTRACT

A rubber composition with 10-50 parts by mass of polyamide short fiber per 100 parts by mass of a rubber and 10-100 parts by mass of a solid lubricant per 100 parts by mass of the rubber.

33 Claims, 2 Drawing Sheets

RUBBER COMPOSITION AND POWER TRANSMISSION BELT INCORPORATING THE RUBBER COMPOSITION

BACKGROUND OF THE INVENTION

1. Field of the Invention

This invention relates to rubber compositions and, more particularly, to a rubber composition that can be used to define a component of a power transmission belt.

2. Background Art

V-ribbed power transmission belts are used extensively in the automotive industry to drive various systems in engine compartments. As examples, these types of belts are commonly utilized to drive air compressors, alternators, etc.

It is common with this type of belt to embed, in ribbed portions of the belt, short fibers such as cotton, polyamide, vinylon, rayon, aramid, etc., with the lengths of the fibers aligned generally widthwise of the belt. The fibers provide lateral reinforcement to the belt body. It is also known to project the fibers from pulley-engaging side surfaces of the belt to controllably alter the frictional characteristics between the belt and cooperating pulley. At the same time, the projecting fibers suppress sound generation caused by adhesion between the belt and cooperating pulleys.

However, by increasing the lateral strength of the belt body through the incorporation of the reinforcing fibers, the ability of the rubber layer to elongate in the lengthwise direction of the belt may be decreased. The reinforcing fibers are commonly embedded in the compression rubber layer which experiences the decreased elongation capabilities. As a result, the bending properties of the reinforced rubber are generally adversely affected. By decreasing bending resistance, there is a tendency of the rubber to crack prematurely in normal operation. This cracking phenomenon is particularly prevalent in systems wherein the belt is caused to be severely bent in a serpentine manner and its outside surface is used to engage cooperating pulleys in use.

The recent trend in the automotive industry has been to design engines with greater displacement. Further, in the interest of reducing gas consumption and harmful emissions after combustion, these engines have been designed to operate in a lean combustion mode. Thus, there is a tendency of these engines to vibrate more significantly during operation than the conventional designs that preceded them. The power transmission belts operating on these engines are thus subjected to more severe vibratory conditions.

Further, these belts are typically operated in more compact engine compartments, thus requiring that they be trained around relatively small diameter pulleys at severe angles through a serpentine path. Thus the belts become heavily loaded and tend to generate a significant amount of sound during use. It is generally believed that the cause of the sound generation is a result of a repeated stick-slip phenomenon that occurs between the belt and cooperating pulleys.

To diminish the effects of this stick-slip phenomenon, it is known to apply powder, such as talc, to the pulley-engaging portions of the belt. It is also known to adhere silicone oil thereto. This surface treatment is intended to decrease the coefficient of friction between the engaging surfaces on the belt and pulleys. One method for treating belts in this manner is shown in JP-UM-B-7-31006.

In JP-A-5-132586, it is described that a silicone oil adsorbed in porous particles, such as activated carbon, on the exposed side surfaces of the belt, will keep the frictional coefficient between the belt and pulleys at a reduced, constant value over an extended operating period.

As another alternative, JP-A-2001-173728 discloses the blending of a solid, inorganic lubricant in a power transmission belt component to control frictional characteristics of the pulley-engaging surfaces thereon.

While applying talc powder or silicone oil to the pulley-engaging surfaces of the belt reduces stick-slip sound generation, generally this positive effect will not last for an adequate, extended period. During the initial stages of use, the coefficient of friction between the belt and pulleys may be adequately reduced. However, after extended running periods, the amount of lubricant/powder may diminish so that the effects thereof on the frictional characteristics of the belt likewise diminish unacceptably.

While the blending into the belt of porous particles with adsorbed silicone oil has extended the positive friction reducing effect over a more substantial period, there are inherent problems associated with making power transmission belts in this manner. It is difficult to uniformly blend and disperse the porous particles throughout the rubber in order to have the oil bleed uniformly and in an adequate amount at the exposed belt surfaces. Further, generally the porous particles only immediately at, or adjacent to, the exposed belt surfaces, bleed appreciably to significantly affect the frictional characteristics. Little, if any, bleeding of oil from any appreciable depth below the exposed surfaces may result.

It is also believed that the blending of a solid lubricant has limitations in terms of its long term effectiveness. Adequate reduction of the coefficient of friction between a belt and cooperating pulley may not be realized with belt constructions incorporating short reinforcing fibers.

SUMMARY OF THE INVENTION

In one form, the invention is directed to a rubber composition with 10-50 parts by mass of polyamide short fiber per 100 parts by mass of a rubber and 10-100 parts by mass of a solid lubricant per 100 parts by mass of the rubber.

In one form, the rubber is ethylene-α-olefin elastomer.

In one form, the solid lubricant is at least one of (a) graphite, (b) molybdenum disulfide, and (c) polytetrafluoroethylene.

Alternatively, the rubber may be at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

The ethylene-α-olefin elastomer may be at least one of (a) ethylene propylene rubber and (b) ethylene propylene diene monomer.

In one form, the polyamide short fibers are at least one of (a) nylon 6, (b) nylon 66, and (c) nylon 610.

The polyamide short fibers may have a length of from 1-8 mm.

In one form, the polyamide short fibers have a denier of 5-10.

The solid lubricant may be at least one of (a) mica, (b) talc, (c) trioxide antimony, (d) molybdenum diselenide, and (e) tungsten disulfide.

The rubber composition may further include carbon black in an amount of 30-60 parts by mass per 100 parts by mass of the rubber.

A process oil may be used in an amount of 4-20 parts by mass per 100 parts by mass of the rubber.

The invention is further directed to a power transmission belt having a body with a length, a tension section and a compression section. The compression section is made at least partially from a rubber composition. The rubber composition has 10-50 parts by mass of polyamide short fiber per 100 parts by mass of a rubber, and 10-100 parts by mass of a solid lubricant per 100 parts by mass of the rubber.

The body may include at least one load carrying member extending lengthwise thereof.

The body may include a cushion rubber layer in which the at least one load carrying member is embedded.

In one form, the rubber is ethylene-α-olefin elastomer.

The solid lubricant may be at least one of (a) graphite, (b) molybdenum disulfide, and (c) polytetrafluoroethylene.

The rubber may alternatively be at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

The ethylene-α-olefin elastomer may be at least one of (a) ethylene propylene rubber and (b) ethylene propylene diene monomer.

The polyamide short fiber may be at least one of (a) nylon 6, (b) nylon 66, and (c) nylon 610.

The polyamide short fibers may have a length of 1-8 mm.

In one form, the polyamide short fibers have a denier of 5-10.

The solid lubricant may be at least one of (a) mica, (b) talc, (c) trioxide antimony, (d) molybdenum diselenide, and (e) tungsten disulfide.

In one form, the rubber composition includes carbon black in an amount of 30-60 parts by mass per 100 parts by mass of the rubber.

The rubber composition may further include a process oil in an amount of 4-20 parts by mass per 100 parts by mass of the rubber.

The power transmission belt may be a V-belt or V-ribbed belt.

In one form, the cushion rubber layer is made at least partially from ethylene-α-olefin elastomer.

Alternatively, the cushion rubber layer may be made from at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

In one form, the cushion rubber layer has no short fibers embedded therein.

The at least one load carrying member may be made from at least one of (a) polyester fiber, (b) aramid fiber, and (c) glass fiber.

The at least one load carrying member may be adhesion treated.

In one form, the adhesion treatment involves treatment with a resorcinol formaldehyde latex solution.

In one form, at least one layer of a reinforcing fabric is applied to the body.

The reinforcing fabric may be at least one of (a) cotton, (b) polyester fiber, (c) aramid fiber, and (d) nylon fiber.

The reinforcing fabric may be made by one of a (a) plain weave, (b) twill weave, and (c) satin weave process.

DETAILED DESCRIPTION OF THE DRAWINGS

Figure 1:
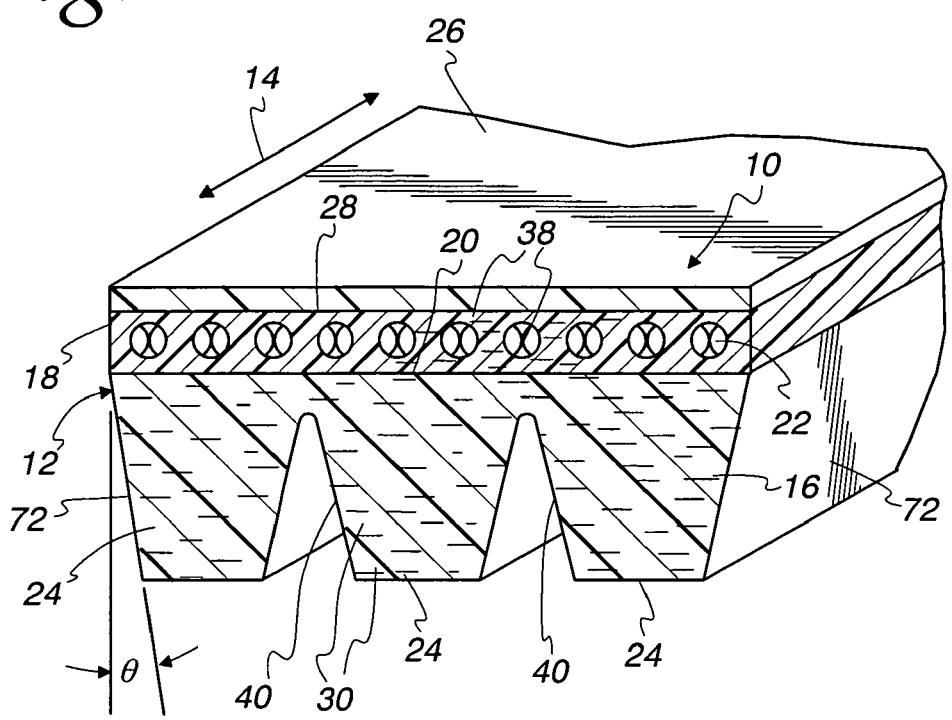
FIG. 1 is a cross-sectional, perspective view of a V-ribbed belt into which the present invention is incorporated.

In FIG. 1, a V-ribbed belt, made according to the present invention, is shown at 10. The V-ribbed belt has a body 12 with a length, extending in the direction of the double-headed arrow 14. The body 12 is defined by a compression rubber layer 16 and a cushion rubber layer 18, which is applied directly to an outside surface 20 of the compression rubber layer 16. It should be understood that the designation "outside" is used only for reference purposes, as the belt 10 may change orientation in operation so that the "outside" surface 20 assumes an inside orientation. At least one load carrying member, in this case in the form of a load carrying cord 22, is embedded in the cushion rubber layer 18. The load carrying cord 22, which defines the neutral region for the belt 10, is made to be of high strength with low elongation properties. The body 12 has a tension section outside of the load carrying cord 22 and a compression section inside of the load carrying cord 22.

Multiple, and in this case three, ribs 24 are formed in the compression rubber layer 16. Each of the ribs 24 has a substantially truncated, triangular shape in cross section. The ribs 24 extend in spaced, parallel relationship continuously along the length of the belt body 12. At least one reinforcing fabric layer 26 is applied to the outside surface 28 of the cushion rubber layer 18.

The rubber making up the compression rubber layer 16 may be, for example, one, or a mixture of, natural rubber, butyl rubber, styrene-butadiene rubber, chloroprene rubber, ethylene propylene rubber, alkylated chlorosulfonated polyethylene, hydride-nitrile rubber, a mixed polymer of hydride-nitrile rubber and a metal salt of an unsaturated carboxylic acid, and an ethylene-α-olefin elastomer. The ethylene-α-olefin elastomer may be at least one of an ethylene propylene rubber (EPR) and ethylene propylene diene monomer (EPDM). Examples of the diene monomer include dicyclopentadience, methylenenorbornene, ethylidenenorbornene, 1,4-hexadiene, cyclooctadience and the like. EPDM is desirable for its excellent high and low temperature resistance. A power transmission belt made with EPDM thus potentially has the ability to perform well in environments wherein it is subjected to extreme heat or cold.

EPDM with an iodine value of 3 to 40 is preferred. If the iodine value is less than 3, vulcanization of the rubber may not be adequate. As a result, abrasion or adhesion problems may be present. If the iodine value is over 40, the scorch time for the rubber composition becomes short. It thus may be difficult to handle, as a result of which heat resistance may be deteriorated.

To cross link the above rubber compositions, sulfur or an organic peroxide may be used. The organic peroxide may be at least one of di-t-butylperoxide, dicumyl peroxide, t-butyl cumyl peroxide, 1.1-t-butylperoxy-3.3.5-trimethylcyclohexane, 2.5-di-methyl-2.5-di (t-butylperoxy)hexane, 2.5-di-methyl-2.5-di(t-butylperoxy)hexane-3, bis(t-butylperoxy diisopropyl) benzene, 2.5-dimethyl-2.5-di-(benzoyl peroxy) hexane, t-butylperoxybenzoate, and t-butylperoxy-2-ethyl hexyl carbonate. The organic peroxide is used alone or as a mixture in the range 0.005 to 0.02 mol g per 100 g of an ethylene-α-olefin elastomer.

A vulcanization accelerator may be used. Examples of vulcanization accelerators are thiazoles, thiurams and sulphenamides. The thiazole vulcanization accelerator may be one, or a combination, of 2-mercaptobenzothiazole, 2-mercaptothiazoline, dibendothiazyl disulfide, zinc salts of 2-mercaptobenzothiazole, and the like. The thiuram vulcanization accelerator may be at least one of tetramethylthiuram monosulfide, tetramethylthiuram disulfide, tetraethylthiuram disulfide, N,N'-dimethyl-N,N'-diphenylthiuram disulfide, and the like. The sulphenamide vulcanization accelerator may be at least one of N-cyclohexyl-2-benzothiazyl sulphenamide, N,N'-cyclohexyl-2-benzothiazyl sulphenamide, and the like.

Other vulcanization accelerators, such as bismaleimide, ethylenethiourea, and the like, may be used either alone or in combination with any of the accelerators noted above.

The likelihood of adhesive abrasion, or the like, may be reduced by blending a crosslinking co-agent, which increases the degree of crosslinking. Suitable crosslinking co-agents include, for example, TIAC, TAC, 1.2-polybutadiene, metal salts of unsaturated carboxylic acids, oximes, guanidine, trimethylolpropane trimethacrylate, ethylene glycol dimethacrylate, N-N'-m-phenylene bismaleimide, sulfur, and the like, which are usually used for peroxide crosslinking.

In the rubber in the compression rubber layer 16, short, reinforcing fibers 30 are used. Suitable fibers 30 include polyamide fibers, such as nylon 6, nylon 66, and nylon 610. Preferably, the fibers 30 have a length in the range 1-8 mm. The preferred denier for the fibers is 5-10. Cotton, rayon, and/or aramid fibers may also be used in place of, or in addition to, the above-mentioned polyamide fibers. It has been found that the use of polyamide short fibers alone reduces stick-slip sound generation effectively.

The short fibers 30 are blended into the rubber in the compression layer 16 in an amount of from 10-50 parts by mass per 100 parts by mass of the rubber. By blending the fibers 30 in an amount of at least 10 parts by mass, the difference in transmission force capability for the power transmission belt 10 in dry and wet conditions is relatively small. This leads to a reduction in the generation of stick-slip sound. As a result, abnormal noise generation may be reduced.

If the short fibers 30 are blended in an amount greater than 50 parts by mass, the dispersion of the fibers 30 in the rubber may not be uniform. This may lead to a deterioration in the properties of the rubber. Thus, the upper limit of 50 parts by mass is preferred.

The compression rubber layer 16 includes a solid lubricant, that may be at least one of graphite, molybdenum disulfide, mica, talc, trioxide antimony, molybdenum diselenide, tungsten disulfide, polytetrafluoroethylene (PTFE), or the like. The solid lubricant is preferably at least one selected from hexagonal or flaky graphite, molybdenum disulfide and polytetrafluoroethylene. Graphite is preferred by reason of its effectiveness in decreasing the coefficient of friction between the cushion rubber layer 16 and cooperating pulley surfaces. At the same time, graphite is relatively low in price.

The solid lubricant is preferably used in an amount of 10-100 parts by mass, and more preferably 10-60 parts by mass, per 100 parts by mass of the rubber in the compression rubber layer 16. If the solid lubricant is present in an amount less than 10 parts by mass, the coefficient of friction between the belt body 12 and cooperating pulley surfaces may not be adequately decreased to significantly reduce stick-slip sound generation. If the amount exceeds 100 parts by mass, the elongation properties of the rubber may be compromised, as a result of which the ultimate life of the belt 10 may be unacceptably reduced.

The rubber composition in the compression rubber layer 16 may also include carbon black. The carbon black is preferably blended in the rubber in an amount of 30-60 parts by mass per 100 parts by mass of the rubber. By blending less than 60 parts by mass, the hardness of the rubber in the compression rubber layer 16 is relatively low. As a result, the rubber contacting a cooperating pulley tends to closely conform to the pulley surface. Thus, force can be positively transmitted between the belt 10 and cooperating pulleys even in wet conditions. If the blending amount of the carbon black is less than 30 parts by mass, the strength of the rubber, as well as its abrasion resistance, may be decreased.

The rubber composition of the compression rubber layer 16 may further include a process oil. Process oil may be blended with the rubber. The process oil acts as a plasticizer, and may reduce the hardness of the rubber by enhancing its plasticity. The process oil also may improve force transmission capabilities for the belt 10 in wet conditions by reason of causing a conformity between the pulley-engaging surfaces on the ribs 24 and cooperating pulley surfaces.

The process oil is preferably blended in an amount of 4-20 parts by mass per 100 parts of the rubber. To provide adequate force transmission capabilities in wet conditions, it is desirable to include the process oil in an amount of at least 4 parts by mass. If the amount is less than 4 parts by mass, the ability of the rubber to be processed through kneading and rolling operations is detrimentally affected. Further, resistance of the ribs 24 to cold may be decreased, as a result of which the lifetime of the belt 10 at low temperatures may become unacceptably short. If the blending amount of the process oil exceeds 20 parts by mass, the strength of the rubber in the ribs 24 may be unacceptably decreased, which may lead to a similar decrease in the abrasion resistance.

The rubber composition used for rubber in the compression rubber layer 16 may be used likewise for the rubber in the cushion rubber layer 18. The rubber compositions in the compression and cushion rubber layers 16,18 for a particular belt may be either the same or different. Optional, short reinforcing fibers 38 are provided in the rubber of the cushion rubber layer 18. However, it is generally preferred that the short fibers 38 not be used. If used, the fibers 38 may have the composition of the fibers 30, as used in the compression rubber layer 16, as described above.

The load carrying cords 22 are preferably made with high strength and low elongation properties. The load carrying cords 22 may be made from one or more of polyester fiber (such as poly-arylate fiber, a polybutylene terephthalate (PBT) fiber, a polyethylene terephthalate (PET) fiber, a polytrimethylene terephthlate (PTT) fiber, a polyethylene naphthalate (PEN) fiber), aramid fiber, glass fiber, and the like.

It is preferred that the load carrying cords 22 be subjected to adhesion treatment to improve adherence of the load carrying cords 22 to the rubber in the cushion rubber layer 18. This treatment may be carried out by dipping the load carrying cords 22 in a solution, such as resorcinol formaldehyde latex (RFL) solution, and subsequently heat drying the dipped cords 22.

The reinforcing fabric layer 26 may be made using a plain weave, twill weave, or satin weave process. The fabric thereof may be made from cotton, polyester fiber, aramid fiber, nylon fiber, and the like. The resulting fabric may be treated with an RFL solution and subsequently coated with a rubber composition.

One manner of forming the V-ribbed belt 10 will now be described. The reinforcing fabric layer 26 is wound around a cylindrical drum (not shown). A rubber sheet used to define the cushion rubber layer 18 is then applied over the reinforcing fabric layer 26 on the drum. The load carrying cord 22 is then spirally wound. A rubber sheet defining the compression rubber layer 16 is then applied to complete a cylindrical preform. The cylindrical preform and drum are put in a vulcanizing jacket, after which vulcanization is carried in a conventional manner. The vulcanized sleeve is then removed from the drum and trained around spaced drive and driven rollers, with the compression rubber layer 16 exposed at the outside thereof. As the sleeve is driven, a grinding wheel is directed against the compression rubber layer 16 to form grooves 40 between adjacent ribs 24. The sleeve is then cut to the desired width for the V-ribbed belt 10. The individual belts are then turned inside out to complete the process.

Figure 2:
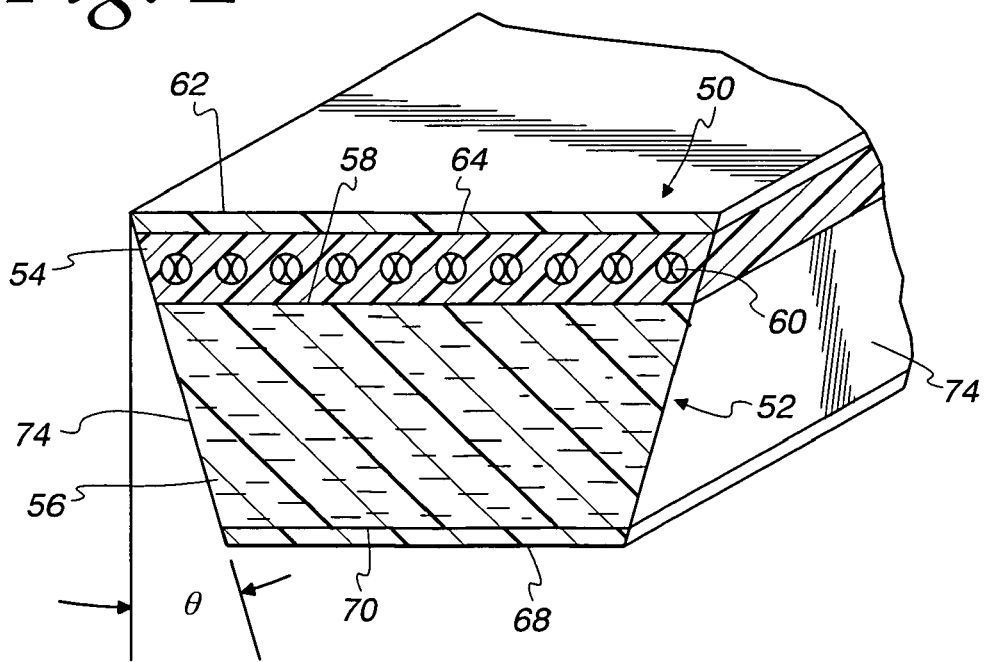
FIG. 2 is a view as in FIG. 1 showing a V-belt into which the present invention is incorporated.

The invention is not limited to practice with a V-ribbed belt construction, and is in fact useable with virtually any type of power transmission belt. As just one other example, the invention can be used with a cut edge V-belt, as shown at 50 in FIG. 2. The belt 50 has a body 52. The body 52 consists of a cushion rubber layer 54 and a compression rubber layer 56. The cushion rubber layer 54 is applied to the outside surface 58 of the compression rubber layer 56. At least one load carrying member, in this case in the form of a load carrying cord 60, is embedded in the cushion rubber layer 54, so that compression and tension sections are defined respectively inside and outside thereof. At least one fabric layer 62 is applied to the outside surface 64 of the cushion rubber layer 54. The fabric layer 62 may be rubberized. A similar or different type of fabric layer 68 is applied to the inside surface 70 of the compression rubber layer 56. Again, it should be noted that the designations "inside" and "outside" are for reference purposes only. Multiple layers, having the same construction as the layer 68, or a different construction, may be applied to the inside of the compression rubber layer 56.

It should be understood that the depicted construction of both of the belts 10,50 is intended for exemplary purposes only. The use of fabric layers 26, 62, 68 is optional, with no, or multiple, layers at each surface contemplated. The use of discrete cushion rubber layers 18, 54 is not required. As just one example, a rubber tension layer may be applied directly to a layer defining part, or all, of the compression section of the belt. Load carrying cords may be embedded in these layers.

With the present invention, it is possible to manufacture a rubber composition with good processability. The rubber composition can be incorporated into a power transmission belt, as in the compression section thereof. A coefficient of friction between the rubber composition and cooperating pulley surfaces is potentially relatively low so that the slip-stick noise generation is controlled. Further, the belt incorporating the rubber composition may have good durability characteristics and the ability to conform to cooperating pulley surfaces to cause positive force transmission between the belt and pulley with the components operating in both wet and dry conditions. The effectiveness of the present invention will now be described by comparing the performance of eight Inventive Examples (Inventive Examples 1-8) with seven Comparative Examples 1-7.

The belts were made as shown in Table 1, below:

TABLE 1

| | Comparative Examples | | | | | | | (Parts by mass) |
|---|---|---|---|---|---|---|---|---|
| | 1 | 2 | 3 | 4 | 5 | 6 | 7 | |
| EPDM | 100 | ← | ← | ← | ← | ← | ← | |
| Nylon 66 Short Fiber | 15 | 20 | 15 | 15 | — | — | — | |
| Aramid Short Fiber | — | — | — | — | — | 10 | — | |
| Cotton Short Fiber | — | — | — | — | — | — | 10 | |
| Carbon Black N330 | 55 | 55 | 55 | — | 40 | 55 | 55 | |
| Graphite | — | — | 5 | 120 | 30 | — | — | |
| Molybdenum Disulfide | — | — | — | — | — | — | — | |
| PTFE | — | — | — | — | — | — | — | |
| Paraffin-based Oil | 5 | ← | ← | ← | ← | ← | ← | |
| dicumyl Peroxide (40%) | 8 | ← | ← | ← | ← | ← | ← | |
| N,N-m-phenylene dimaleimide | 2 | ← | ← | ← | ← | ← | ← | |
| Mercaptobenzoimidazole | 2 | ← | ← | ← | ← | ← | ← | |
| Hardness (JIS-A) | 82 | 84 | 83 | 87 | 80 | 84 | 85 | |
| Elongation (perpendicular) (%) | 200 | 190 | 200 | 140 | 250 | 210 | 200 | |
| Thrust Friction Test Friction Coefficient | 1.60 | 1.50 | 1.50 | 0.85 | 1.50 | 1.20 | 1.70 | |

| | Inventive Examples | | | | | | | |
|---|---|---|---|---|---|---|---|---|
| | 1 | 2 | 3 | 4 | 5 | 6 | 7 | 8 |
| EPDM | 100 | ← | ← | ← | ← | ← | ← | ← |
| Nylon 66 Short Fiber | 15 | ← | ← | ← | ← | 20 | ← | ← |
| Aramid Short Fiber | — | — | — | — | — | — | — | — |
| Cotton Short Fiber | — | — | — | — | — | — | — | — |
| Carbon Black N330 | 45 | 40 | 30 | 20 | 10 | 40 | 55 | 55 |
| Graphite | 10 | 30 | 50 | 80 | 100 | 30 | — | — |

TABLE 1-continued

| | | | | | | | | |
|---|---|---|---|---|---|---|---|---|
| Molybdenum Disulfide | — | — | — | — | — | — | 30 | — |
| PTFE | — | — | — | — | — | — | — | 30 |
| Paraffin-based Oil | 5 | ← | ← | ← | ← | ← | ← | ← |
| dicumyl Peroxide (40%) | 8 | ← | ← | ← | ← | ← | ← | ← |
| N,N-m-phenylene dimaleimide | 2 | ← | ← | ← | ← | ← | ← | ← |
| Mercaptobenzoimidazole | 2 | ← | ← | ← | ← | ← | ← | ← |
| Hardness (JIS-A) | 82 | 82 | 85 | 85 | 87 | 84 | 85 | 85 |
| Elongation (perpendicular) (%) | 220 | 250 | 230 | 230 | 180 | 195 | 200 | 190 |
| Thrust Friction Test Friction Coefficient | 1.15 | 1.05 | 1.00 | 0.90 | 0.90 | 1.05 | 1.15 | 1.00 |

Short fibers, carbon black, a paraffin-based process oil and a solid lubricant were blended in EPDM (iodine value 4). A rubber sheet with a predetermined thickness was made using a calendar roll and vulcanized at 165° C. for 30 minutes. The short fibers included nylon 66 fibers with a length of 3 mm, aramid short fibers with a length of 3 mm, and cotton short fibers with a length of 6 mm, added as indicated in Table 1. The solid lubricant included molybdenum disulfide, PTFE and graphite added as shown in Table 1. The hardness (JIS-A) of the resulting vulcanized rubber, and the elongation at break (in a direction perpendicular to the orientation of the short nylon 66 fibers) were measured in accordance with JIS K6253 and JIS K6251, respectively. A thrust friction test, corresponding to that in JIS K7218, was conducted. The test was conducted with a sliding speed of 0.06 m/sec, pressurizing force of 50 N, and sliding distance of 0.1 km. When the temperature of the test samples reached 50° C., a dynamic friction coefficient was measured, as set out in Table 1.

As can be seen, where nylon short fibers were used, the friction coefficient was high for Comparative Examples 1 and 2, in which graphite was not used as a solid lubricant, and Comparative Example 3, in which the graphite content was low. On the other hand, the frictional coefficient was low, but the elongation at break was extremely low for Comparative Example 4, in which the content of graphite exceeded 100 parts by mass. On the contrary, it was found that the friction coefficient was high for Comparative Example 5, in which graphite was included and nylon short fibers were not included. The friction coefficient was not decreased adequately in Comparative Example 6, in which aramid short fibers were used, but no graphite was used. The reduction in the friction coefficient was low for Comparative Example 7, in which cotton short fibers were used and no graphite was used.

With Inventive Examples 1-8, which had blended nylon short fibers and a solid lubricant in EPDM, the friction coefficients were low, with the elongation at break maintained at a high level. These compositions proved suitable for use to define a component of a power transmission belt. It is noted that the reduction in the friction coefficients resulting from the use of graphite and PTFE was higher than resulted from using molybdenum disulfide.

Additional comparative testing was undertaken with respect to Inventive Examples 9-14 and Comparative Examples 8-16, having a composition as set forth in the following Table 2.

TABLE 2

| | | | | | | | | | | | | | | | (Parts by mass) |
|---|---|---|---|---|---|---|---|---|---|---|---|---|---|---|---|
| | | Comparative Examples | | | | | | | | Inventive Examples | | | | | |
| | 8 | 9 | 10 | 11 | 12 | 13 | 14 | 15 | 16 | 9 | 10 | 11 | 12 | 13 | 14 |
| EPDM | 100 | ← | ← | ← | ← | ← | ← | ← | ← | 100 | ← | ← | ← | ← | ← |
| Nylon 66 Short Fiber | 20 | 50 | 50 | 5 | 15 | — | — | — | — | 50 | 30 | 20 | 20 | 20 | 10 |
| Aramid Short Fiber | — | — | — | — | — | — | 10 | — | 10 | — | — | — | — | — | — |
| Cotton Short Fiber | — | — | — | — | — | — | — | 10 | — | — | — | — | — | — | — |
| Carbon Black N330 | 55 | 55 | 55 | — | — | 40 | 55 | 55 | 40 | 45 | 40 | 40 | 50 | 50 | 10 |
| Graphite | — | — | 5 | 120 | 120 | 30 | — | — | 30 | 10 | 30 | 30 | — | — | 100 |
| Molybdenum Disulfide | — | — | — | — | — | — | — | — | — | — | — | — | 30 | — | — |
| PTFE | — | — | — | — | — | — | — | — | — | — | — | — | — | 30 | — |
| Paraffin-based Oil | 5 | ← | ← | ← | ← | ← | ← | ← | ← | 5 | ← | ← | ← | ← | ← |
| dicumyl Peroxide (40%) | 8 | ← | ← | ← | ← | ← | ← | ← | ← | 8 | ← | ← | ← | ← | ← |
| N,N-m-phenylene dimaleimide | 2 | ← | ← | ← | ← | ← | ← | ← | ← | 2 | ← | ← | ← | ← | ← |
| Mercaptobenzoimidazole | 2 | ← | ← | ← | ← | ← | ← | ← | ← | 2 | ← | ← | ← | ← | ← |
| Noise Generation limit tension (kgf) | In initial stage | 30 | 40 | 40 | / | / | 50 | 25 | 40 | 25 or less | 25 | 25 or less | 25 or less | 25 | 25 or less | 25 |
| | After running break in | 40 | 50 | 40 | / | / | 50 | 50 | 60 | 40 | 25 | 25 or less | 25 or less | 25 | 25 or less | 25 |
| Processability* | ○ | ○ | ○ | Δ | x | ○ | ○ | ○ | ○ | ○ | ○ | ○ | ○ | ○ | ○ |

*○: the case where no split or holes present in the sheet and a sheet with smooth surface is obtained.
Δ: the case where no split or holes present in the sheet, but a fine split on the surface is generated.
x: the case where a split or a hole is present in the sheet and it cannot be used as a rubber sheet for compression rubber layer.

For the belts in Table 2, short fibers, carbon black, a solid lubricant, a paraffin-based process oil, and the like, were blended in EPDM (iodine value 4). A rubber sheet for the compression rubber layer was made using a calendar roll. The short fibers used were nylon 66 with a length of 3 mm, aramid fibers with a length of 3 mm, and cotton fibers with a length of 6 mm, as shown in Table 2. The solid lubricants were molybdenum disulfide, PTFE and graphite, as also shown in Table 2. A rubber sheet for a cushion rubber layer was made from EPDM rubber, without short fibers, according to Table 2. Load carrying cords made from polyester fiber were utilized, as were rubberized cotton canvas layers for reinforcement of the belt bodies.

In conducting the tests, V-ribbed belts were produced with a length of 1770 mm, and a thickness of 4.3 mm. The rib number was 7 with an inclination angle ($\alpha$) of 40° for the side surfaces 72 and 74, for the belts 10, 50, respectively. The height of the ribs on the V-ribbed belts was 2.0 mm.

A noise generation limit tension test, to evaluate noise generation, was undertaken. Roll processability for the rubber sheet of the compression rubber layer was analyzed.

Figure 3:
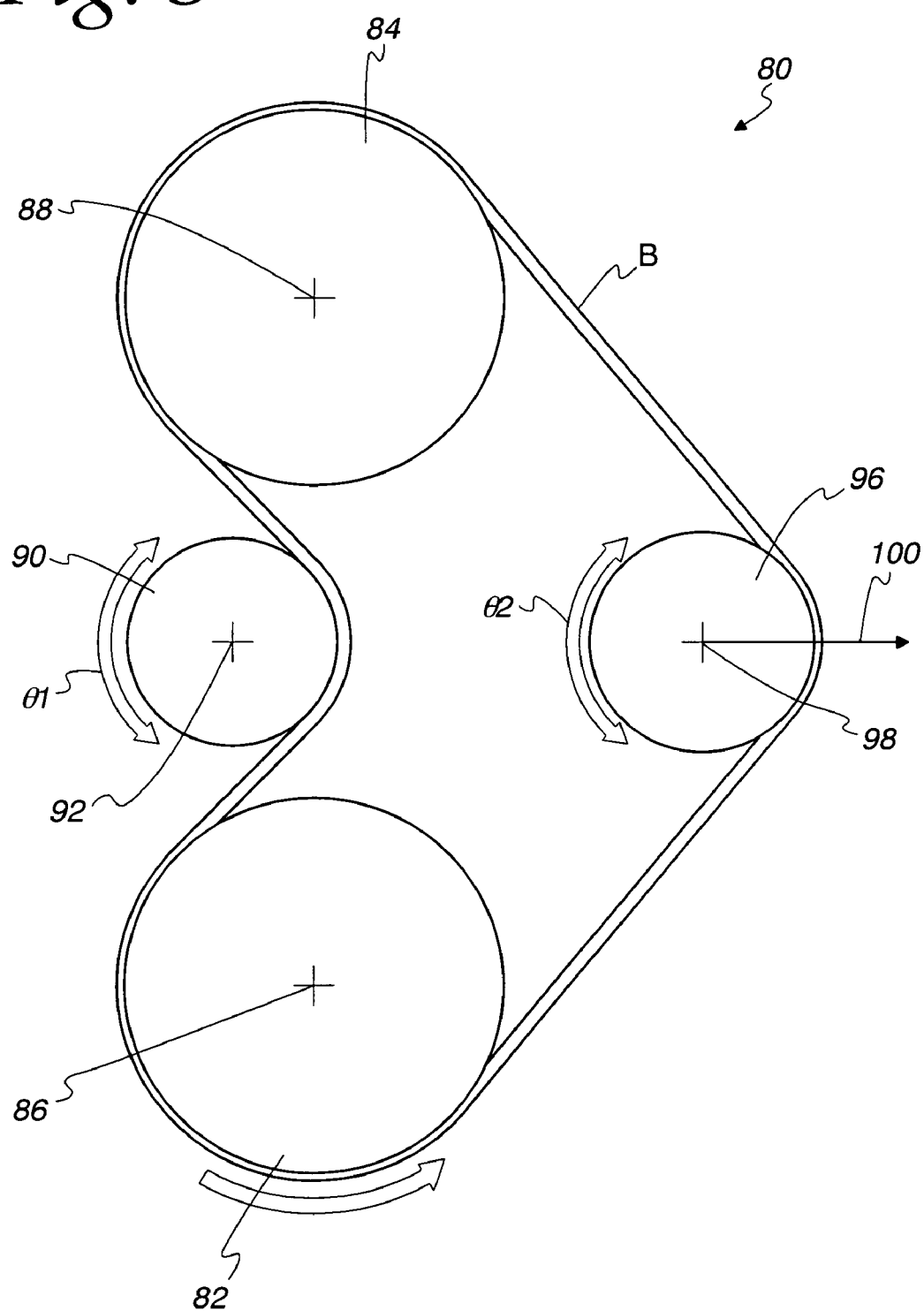
FIG. 3 is a schematic representation of a layout for test running belts.

In conducting the noise generation limit tension test, the V-ribbed belts B were trained around a system as shown at 80 in FIG. 3. The system 80 included a drive pulley 82 and a driven pulley 84, rotated around spaced, parallel axes 86, 88, respectively. The drive pulley 82 had a diameter of 135 mm, with the driven pulley 84 having a diameter of 112 mm. A second driven pulley 90, with a diameter of 60 mm, was mounted for movement around an axis 92, parallel to the axes 82, 88. The driven pulley 90 had a clutch mechanism. The belts B tested were trained around the drive and driven pulleys 82, 84, 90 with a wrap angle $\theta 1$ around the driven pulley 90 of 120°. The test belts B were pretensioned using a tensioning pulley 96 rotatable around an axis 98. The wrap angle $\theta 2$ for the tensioning pulley 96 was 90°. Tension was applied by exerting a force on the belts B through the tensioning pulley 96 in the direction of the arrow 100. The creak generated at the time the second driven pulley began to rotate, with the drive pulley 82 rotated at 5,000 rpm at room temperature, was determined. The noise generation limit tension at this point was likewise determined. A noise generation limit tension test was conducted, as described above, after the belts were run for a break in period of 1890 hours at room temperature. The results are shown in Table 2.

In analyzing roll processability of the rubber sheet for the compression rubber layer, various conditions were identified. The symbol "○" is used to identify a condition where no split or holes in the sheet occurred and the sheet had a smooth surface. The symbol "Δ" is used to identify a condition where no split or holes in the sheet occurred but a fine split on the surface was generated. The symbol "×" is used to identify a condition where there was a split or a hole in the sheet and the sheet could not be used as a layer in a compression section of a power transmission belt.

It can be seen that the noise generation limit tensions at the initial stage and after the running break in were both high, and the suppression effect on stick-slip sound generation was poor for Comparative Examples 8 and 9. Both examples used nylon without graphite. Similar results are seen for Comparative Example 10, in which nylon was included and the graphite content was low. Processability was poor for Comparative Examples 11 and 12, which had high graphite content. These compositions were thus not practical for use in forming a V-rib belt. Comparative Example 13 showed a low suppression of stick-slip sound generation. Comparative Example 13 did not include short nylon fibers and did include an appropriate amount of graphite. Comparative Example 14, which used aramid short fibers and no graphite, showed poor long term suppression effect on noise generation. For Comparative Example 15, which utilized cotton fibers, the noise generation limit tension was high in the initial running stage. For Comparative Example 16, which utilized aramid fiber and graphite, a good suppression effect on noise generation was observed at the initial stage. However, the suppression effect on noise generation decreased significantly after running. Thus, the improved effects did not continue for an adequately long period of time.

On the other hand, with Inventive Examples 9-14, which included an appropriate amount of graphite and nylon fibers, processability was good, the friction coefficient was low, and noise generation limit tension was low. As a result, stick-slip sound generation was reduced and good force transmission capability was maintained. It was found that the noise generation suppression effects of graphite and PTFE were higher than for molybdenum disulfide.

While the invention has been described with particular reference to the drawings, it should be understood that various modifications could be made without departing from the spirit and scope of the present invention.

The invention claimed is:

1. A rubber composition comprising:
    10-50 parts by mass of polyamide short fiber per 100 parts by mass of a rubber; and
    10-100 parts by mass of a solid lubricant per 100 parts by mass of the rubber, wherein the polyamide short fibers have a length of 1-8 mm and denier of 5-10.

2. The rubber composition according to claim 1 wherein the rubber comprises ethylene-$\alpha$-olefin elastomer.

3. The rubber composition according to claim 1 wherein the solid lubricant comprises at least one of (a) graphite, (b) molybdenum disulfide, and (c) polytetrafluoroethylene.

4. The rubber composition according to claim 2 wherein the solid lubricant comprises at least one of (a) graphite, (b) molybdenum disulfide, and (c) polytetrafluoroethylene.

5. The rubber composition according to claim 2 wherein the ethylene-$\alpha$-olefin elastomer comprises at least one of (a) ethylene propylene rubber and (b) ethylene propylene diene monomer.

6. The rubber composition according to claim 1 wherein the rubber comprises at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

7. The rubber composition according to claim 1 wherein the polyamide short fibers comprise at least one of (a) nylon 6, (b) nylon 66, and (c) nylon 610.

8. The rubber composition according to claim 1 wherein the solid lubricant comprises at least one of (a) mica, (b) talc, (c) trioxide antimony, (d) molybdenum diselenide, and (e) tungsten disulfide.

9. The rubber composition according to claim 1 further comprising carbon black in an amount of 30-60 parts by mass per 100 parts by mass of the rubber.

10. The rubber composition according to claim 1 further comprising a process oil in an amount of 4-20 parts by mass per 100 parts by mass of the rubber.

11. A power transmission belt comprising:
    a body having a length, a tension section and a compression section,
    the compression section comprising a rubber composition,
        the rubber composition comprising:

(a) 10-50 parts by mass of polyamide short fiber per 100 parts by mass of a rubber; and (b) 10-100 parts by mass of a solid lubricant per 100 parts by mass of the rubber, wherein the polyamide short fibers have a length of 1-8 mm and denier of 5-10.

12. The power transmission belt according to claim 11 wherein the body comprises at least one load carrying member extending lengthwise of the body.

13. The power transmission belt according to claim 12 wherein the body comprises a cushion rubber layer in which the at least one load carrying member is embedded.

14. The power transmission belt according to claim 13 wherein the rubber comprises ethylene-α-olefin elastomer.

15. The power transmission belt according to claim 14 wherein the solid lubricant comprises at least one of (a) graphite, (b) molybdenum disulfide, and (c) polytetrafluoroethylene.

16. The power transmission belt according to claim 13 wherein the rubber comprises at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

17. The power transmission belt according to claim 14 wherein the ethylene-α-olefin elastomer comprises at least one of (a) ethylene propylene rubber and (b) ethylene propylene diene monomer.

18. The power transmission belt according to claim 13 wherein the solid lubricant comprises at least one of (a) graphite, (b) molybdenum disulfide, and (c) polytetrafluoroethylene.

19. The power transmission belt according to claim 13 wherein the polyamide short fiber comprises at least one of (a) nylon 6, (b) nylon 66, and (c) nylon 610.

20. The power transmission belt according to claim 13 wherein the solid lubricant comprises at least one of (a) mica, (b) talc, (c) trioxide antimony, (d) molybdenum diselenide, and (e) tungsten disulfide.

21. The power transmission belt according to claim 13 wherein its rubber composition further comprises carbon black in an amount of 30-60 parts by mass per 100 parts by mass of the rubber.

22. The power transmission belt according to claim 13 further comprising a process oil in an amount of 4-20 parts per 100 parts by mass of the rubber.

23. The power transmission belt according to claim 13 wherein the cushion rubber layer comprises ethylene-α-olefin elastomer.

24. The power transmission belt according to claim 13 wherein the cushion rubber layer comprises at least one of (a) natural rubber, (b) butyl rubber, (c) styrene-butadiene rubber, (d) chloroprene rubber, (e) ethylene propylene rubber, (f) alkylated chlorosulfonated polyethylene, (g) hydride-nitrile rubber, and (h) a mixed polymer of hydride-nitrile rubber and a metal salt of an unsaturated carboxylic acid.

25. The power transmission belt according to claim 13 wherein the cushion rubber layer has no short fibers embedded therein.

26. The power transmission belt according to claim 12 wherein the at least one load carrying member comprises at least one of (a) polyester fiber, (b) aramid fiber, and (c) glass fiber.

27. The power transmission belt according to claim 26 wherein the at least one load carrying member is adhesion treated.

28. The power transmission belt according to claim 26 wherein the at least one load carrying member is adhesion treated with a resorcinol formaldehyde latex solution.

29. The power transmission belt according to claim 11 wherein the power transmission belt comprises a V-ribbed belt.

30. The power transmission belt according to claim 11 wherein the power transmission belt comprises a V-belt.

31. The power transmission belt according to claim 11 wherein at least one layer of a reinforcing fabric is applied to the body.

32. The power transmission belt according to claim 31 wherein the reinforcing fabric comprises at least one of (a) cotton, (b) polyester fiber, (c) aramid fiber, and (d) nylon fiber.

33. The power transmission belt according to claim 31 wherein the reinforcing fabric is made by one of a (a) plain weave, (b) twill weave, and (c) satin weave process.

* * * * *